(No Model.)

O. A. ENHOLM.
ELECTRIC RAILWAY.

No. 514,120. Patented Feb. 6, 1894.

WITNESSES:
Frank S. Ober
Jo. J. Uhl.

INVENTOR
Oscar A. Enholm

BY
Wm A. Rosenbaum
ATTORNEY

UNITED STATES PATENT OFFICE.

OSCAR A. ENHOLM, OF NEW YORK, N. Y., ASSIGNOR TO EDWARD C. REISS AND JOHN J. ASHLEY, OF BROOKLYN, NEW YORK, AND FRANK M. ASHLEY, OF HAWTHORNE, NEW JERSEY.

ELECTRIC RAILWAY.

SPECIFICATION forming part of Letters Patent No. 514,120, dated February 6, 1894.

Application filed October 3, 1892. Serial No. 447,593. (No model.)

*To all whom it may concern:*

Be it known that I, OSCAR A. ENHOLM, a citizen of the United States, residing at New York, in the county of New York and State of New York, have invented certain new and useful Improvements in Electric Railways, of which the following is a full, clear, and exact description.

This invention relates to electric railways, and has special reference to the construction of a conduit system.

The object of the invention is to provide a system in which a sectional working conductor is used in connection with an isolated continuous main conductor wherein the circuit is closed between the main and sectional conductor as the car moves along the roadway, by a traveling device such as a trolley which moves in a conduit, which is hermetically sealed. It is therefore protected from injury from all sources and cannot be interfered with by moisture.

The invention consists of the construction which will be hereinafter described and claimed.

Figure 1:
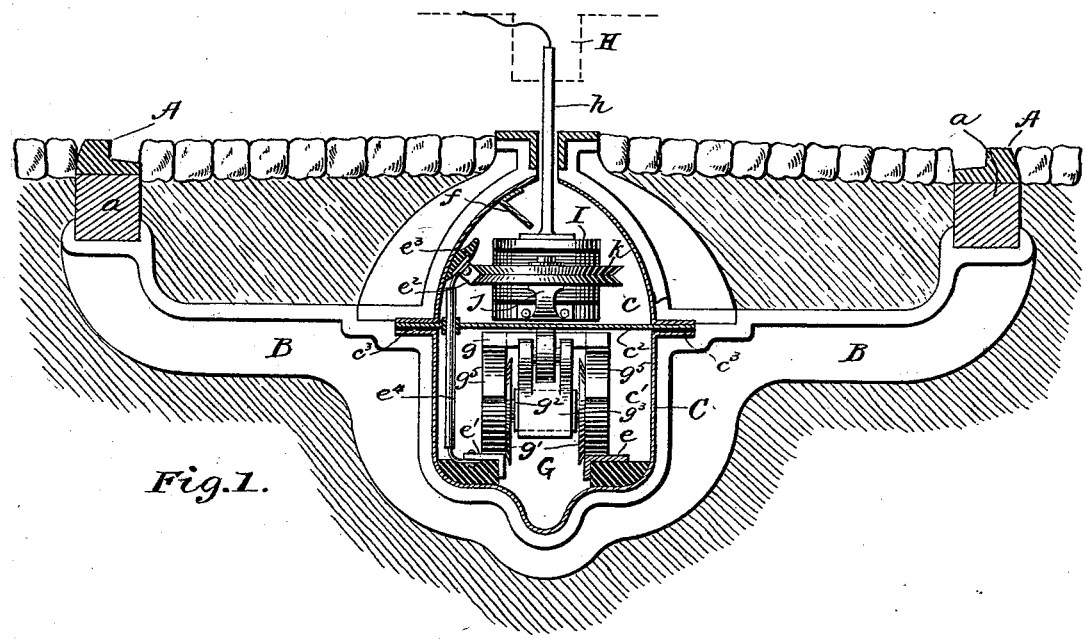
Figure 2:
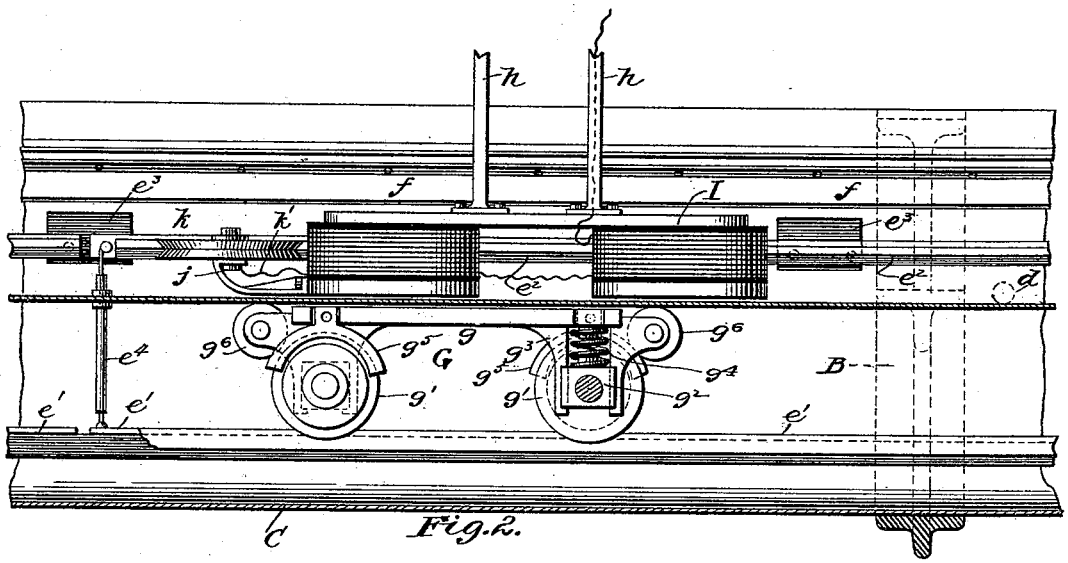

In the accompanying drawings, Figure 1 represents a cross-section of the roadbed and conduit, showing the devices which move in the conduit, in elevation. Fig. 2 is a longitudinal central section of the conduit.

Referring to the drawings by letter, A A represent the rails of a car-track; these are supported upon string pieces $a$ which are carried by the two arms of an iron yoke B. This yoke forms the support of the conduit located underground midway between the rails. The conduit is formed of sheet metal C and is divided into two longitudinal compartments or ducts $c$, $c'$ by a horizontal partition of sheet metal or other suitable material $c^2$. The edges of this partition extend into the sides of the conduit and are between two flanges of the upper and lower halves of the conduit. At this joint packing material $c^3$ is provided for the purpose of making it water-tight. The lower compartment is entirely closed, although, if desired, connections may be made at the bottom with the sewer to carry off any waters of condensation. The upper half is closed except at the top, where there is a slot in the usual manner to admit the plow or arm from the car. This upper compartment is also connected with the sewer at intervals by lateral pipes, indicated in dotted lines at $d$ in Fig. 2. In the lower compartment two tracks are laid one in each lower corner. One of them $e$ is electrically continuous, while the other $e'$, although a conductor, is made in section. In the upper compartment a sectional conductor $e^2$ is fixed to the side of the conduit on suitable insulators $e^3$. This conductor is also made in sections which are of the same length as the sections of the conductor $e'$ and the sections of the two conductors $e'$, and $e^2$ are respectively connected together electrically by branch conductors $e^4$. These branches are suitably insulated and pass through perforations in the horizontal partition $c^2$. In the upper conduit there is also a water-shed $f$ to protect the conductor $e^2$. Upon the conductors $e$, $e'$ a circuit-closing trolley G runs; this consists of a block or plate of soft iron $g$, standing parallel and adjacent to the partition $c^2$ and mounted upon four wheels $g'$, which rest upon the tracks or conductors $e$, $e'$. The wheels and axles are metallic so that they conduct current from one of the tracks or conductors $e$ to the other $e'$. The axle boxes $g^2$ are mounted loosely between guides $g^3$ depending from the under side of the block $g$, and spiral springs $g^4$ support the body upon the axle boxes. The body $g$ carries four brake-shoes $g^5$ which stand directly above each wheel.

$g^6$ $g^6$ represent two rollers which prevent the body $g$ from striking and sliding upon the horizontal partition $c^2$.

A portion of the car is shown in dotted lines at H; from this car two arms $h$ extend through the slot in the conduit into the upper compartment thereof and carry at their lower ends a horse-shoe electro-magnet I, the arms being attached to the back yoke of the said magnet and the polar faces of the magnet stand parallel and in close proximity to the partition $c^2$. To the front of the magnet is secured a bracket $j$ carrying a trolley or collector $k$, horizontally disposed and bearing against the sectional conductor $e^2$. The current taken by this collector is taken therefrom by wire $k'$ around the coils of the electro-magnet I, and thence up through the plow to the motor carried by the car.

The operation of the system is as follows: Current through the main conductor $e$ is conveyed through the wheels and axles of the trolley G to a section of the conductor $e'$ thence through a branch $e^4$ to the corresponding section of the conductor $e^2$, thence through the collector $k$, through the electro-magnet I and through the motor on the vehicle. The electro-magnet I attracts the soft iron armature $g$ of the trolley G, and lifts it until the rollers $g^6$ come into contact with the partition $c^2$. When the motor propels the car the trolley G is carried along with it by the attraction between the magnet and its armature $g$, so that the trolley and car travel together and the former successively cuts the sections $e'$ out and is thus constantly supplying the motor on the car from the main $e$. At the same time the sections of the conductor $e^2$ behind and ahead of the car are "dead," and therefore not dangerous to life and not subject to leakage. When the circuit through the motor is open, magnet I becomes de-energized and releases its armature $g$ which then falls until the brake-shoes $g^5$ which it carries, rest upon the periphery of the wheels and stop the motion of the trolley. The length of the magnet I and that of the trolley G is such that the trolley will always be stopped within attractive distance of the magnet.

Having thus described my invention, I claim—

1. In a conduit system for electric railways a conduit divided into two longitudinal compartments, one sealed and the other open, a circuit-controller running in the sealed compartment, a collector running in the open compartment, and electro-magnetic apparatus carried with the collector and controlling the movements of the circuit-controller, substantially as described.

2. In an electric railway, a conduit divided into two compartments, a continuous and a sectional conductor in one compartment, a traveling circuit closer moving in contact with both of said conductors, an armature carried by said circuit-closer, a sectional conductor in the other of said compartments, the sections of the two sectional conductors being respectively connected together, a collector carried by the car and moving in contact with the second sectional conductor, an electro-magnet also carried by the car, the armature of said circuit-closer being under the influence of said electro-magnet whereby the circuit-closer is caused to move with the car and maintain the circuit to the motor carried thereby.

3. In an electric railway system, a traveling circuit closer consisting of an iron frame or body constituting an armature, mounted upon wheels but free to move vertically and independently thereof, brake-shoes carried by said body or frame and standing adjacent to the wheels and an electro-magnet carried by a moving car, the said frame or body being under the influence of the magnet, for the purpose set forth.

In testimony whereof I subscribe my signature in presence of two witnesses.

OSCAR A. ENHOLM.

Witnesses:
FRANK S. OBER,
JOS. J. UHL.